Jan. 20, 1959     R. E. WILLIAMS     2,869,715
CONTINUOUS FEEDER APPARATUS
Original Filed Jan. 23, 1956     4 Sheets-Sheet 1
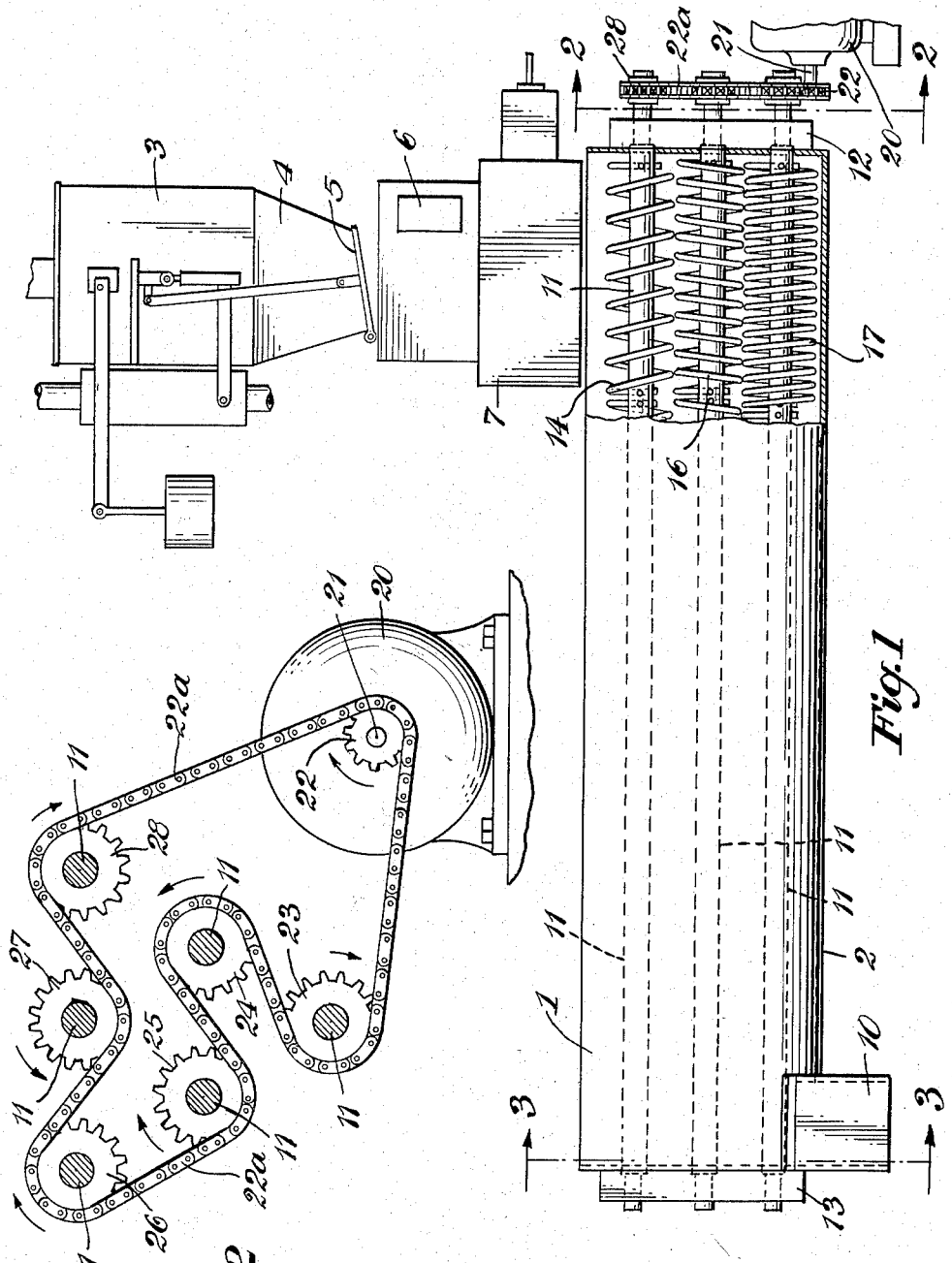
Inventor
Ralph E. Williams
by Parker & Carter
Attorneys Jan. 20, 1959 R. E. WILLIAMS 2,869,715
CONTINUOUS FEEDER APPARATUS
Original Filed Jan. 23, 1956 4 Sheets-Sheet 2
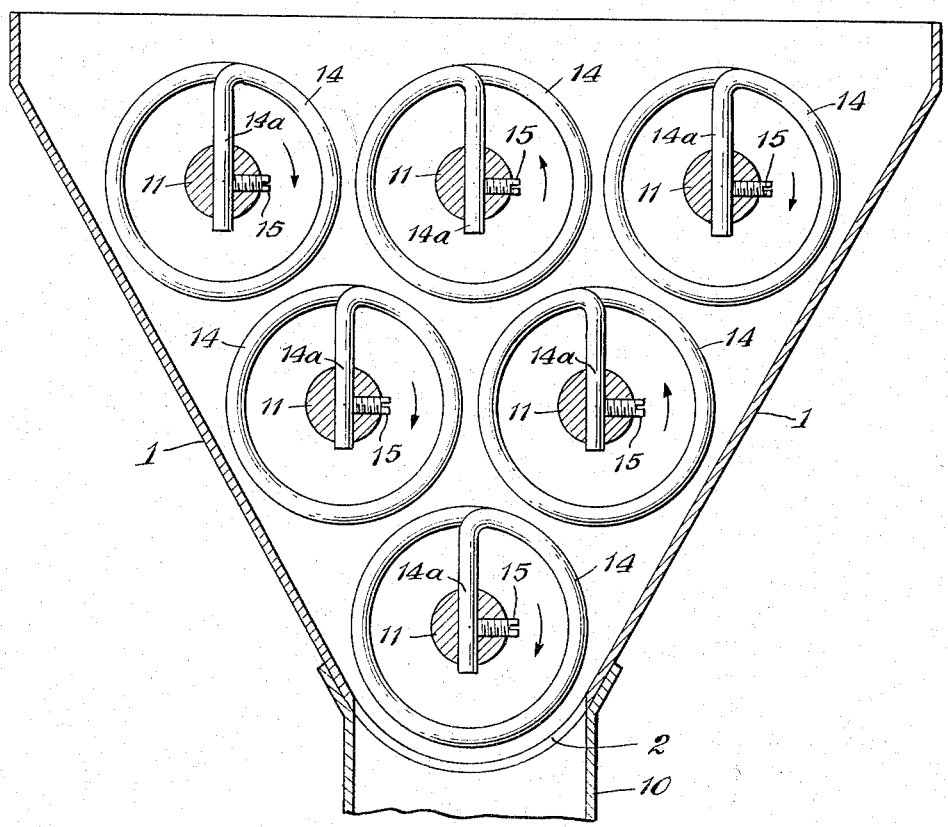
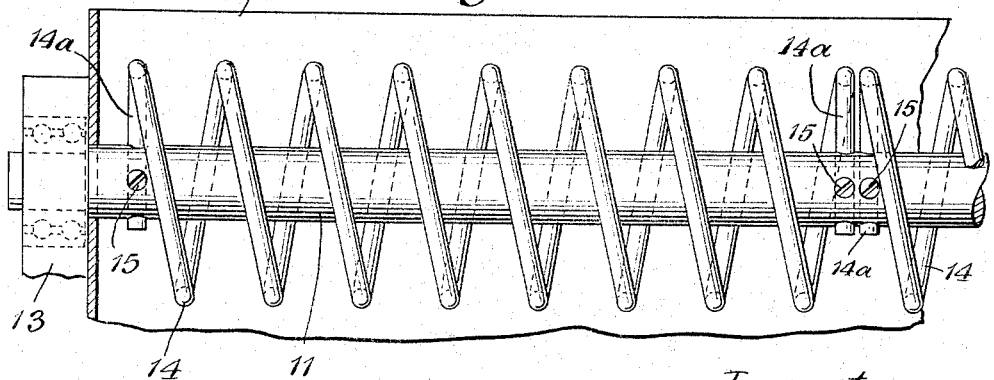
Inventor
Ralph E. Williams
by Parker & Carter
Attorneys Jan. 20, 1959 R. E. WILLIAMS 2,869,715
CONTINUOUS FEEDER APPARATUS
Original Filed Jan. 23, 1956 4 Sheets-Sheet 3
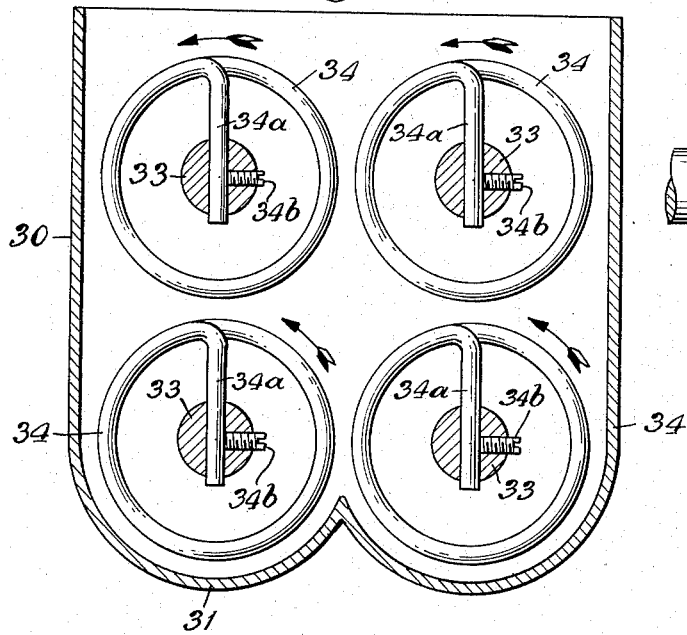
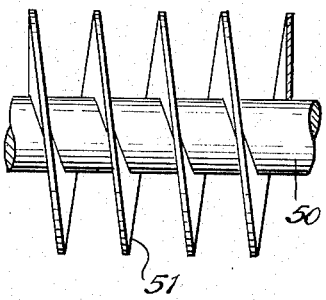
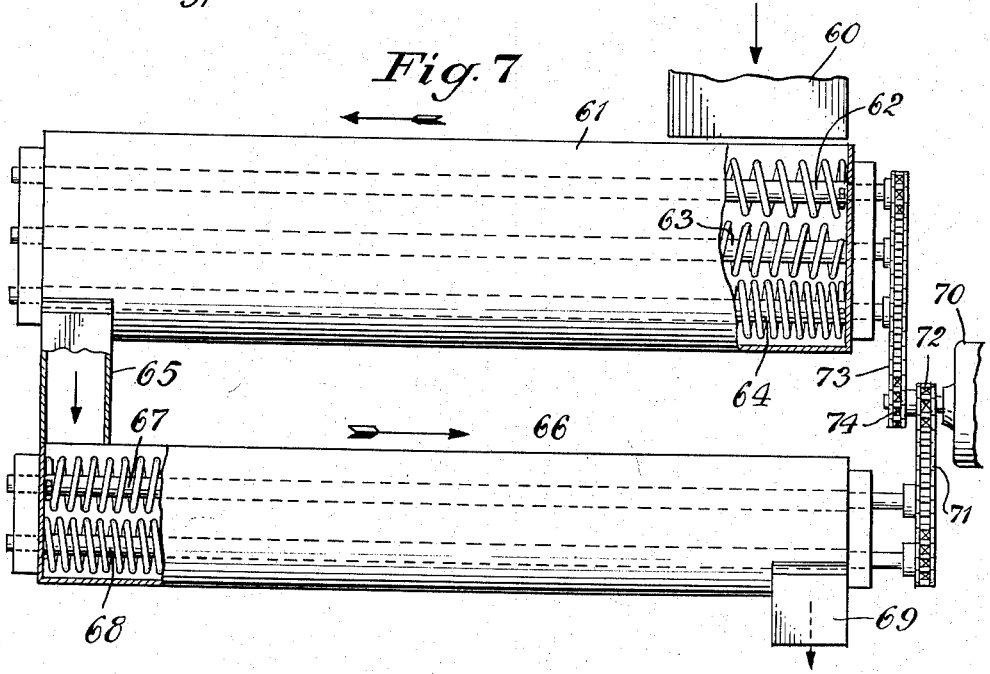
Inventor
Ralph E. Williams
by Parker & Carter
Attorneys Jan. 20, 1959 R. E. WILLIAMS 2,869,715
CONTINUOUS FEEDER APPARATUS
Original Filed Jan. 23, 1956 4 Sheets-Sheet 4
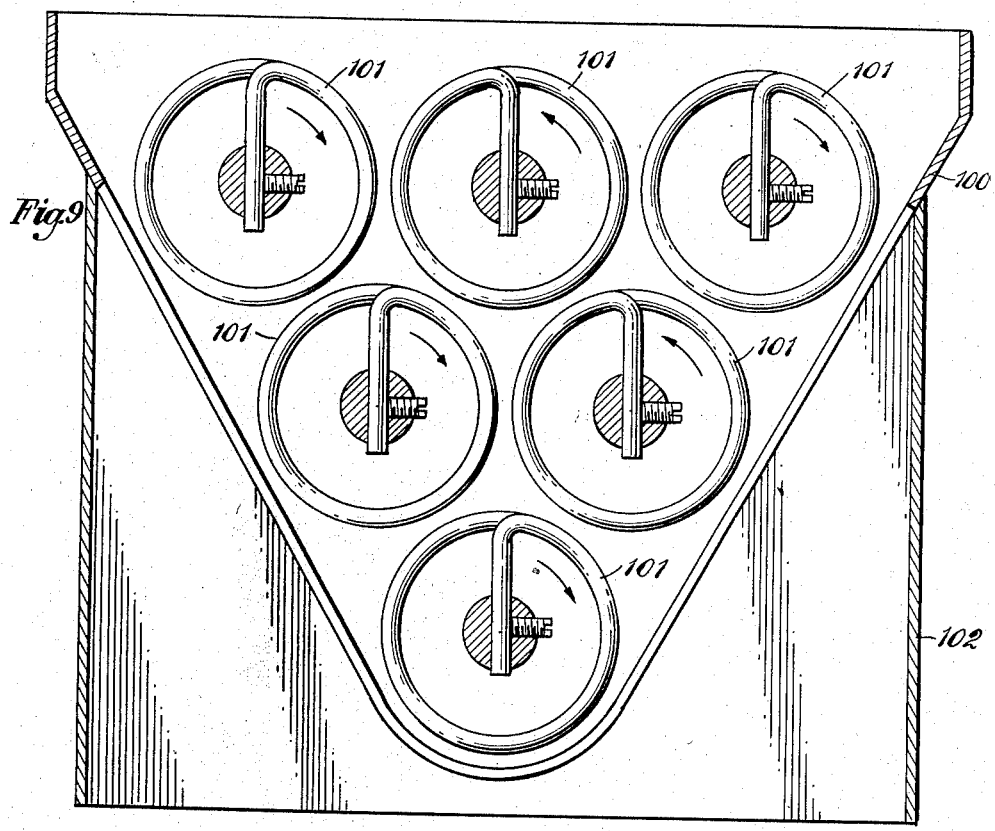
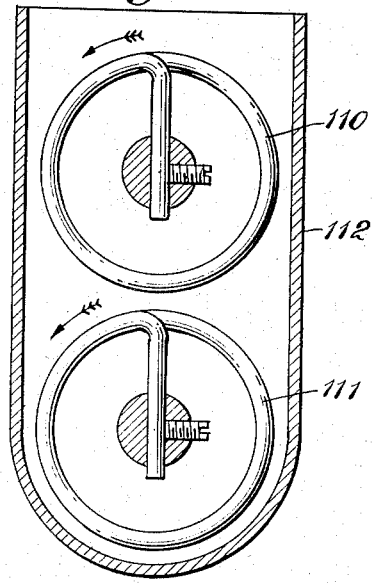
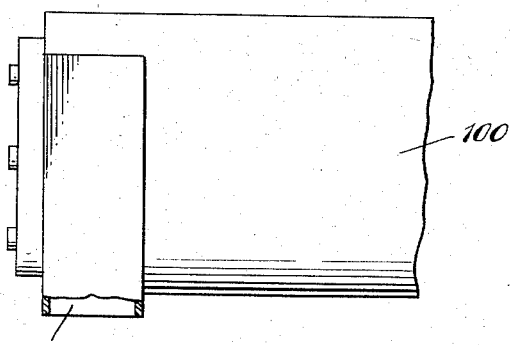
Inventor
Ralph E. Williams
by Parker & Carter
Attorneys

2,869,715
CONTINUOUS FEEDER APPARATUS

Ralph E. Williams, La Grange, Ill., assignor to B. F. Gump Co., Chicago, Ill., a corporation of Illinois Original application January 23, 1956, Serial No. 560,786. Divided and this application April 29, 1957, Serial No. 655,710

14 Claims. (Cl. 198—213)

My invention relates to an improvement in continuous feeding mechanism, and, particularly, to continuous weighing feeders. One purpose is to provide a feeder which will receive irregular or batch feed, and which will deliver a continuous and uniform stream. My improvement is particularly suited for handling bulk materials, in powdered, flaked, crystalline or granular form such as, for example, chemicals, cereals, food products and the like.

Another purpose is to provide feeding means effective for damping out irregularities of feed and for converting an irregular feed to a regular, continuous, uniform flow.

Another purpose is to provide an improved conveyor element adapted for use with feeders and the like.

Another purpose is to provide an improved method of making or assembling conveying elements adapted for use in my device.

Another purpose is to provide a continuous weighing feeder.

Other purposes will appear from time to time in the course of the specification and claims.

I illustrate my invention more or less diagrammatically in the accompanying drawings, wherein:

Figure 1 is a side elevation, with parts broken away;

Figure 2 is a section, on an enlarged scale, on the line 2—2 of Figure 1;

Figure 3 is a section, on an enlarged scale, on the line 3—3 of Figure 1;

Figure 4 is a side elevation of one of the feed elements shown in Figure 3;

Figure 5 is a section similar to Figure 3 through another form or arrangement of my device;

Figure 6 is a side elevation of a varying type of conveying element;

Figure 7 is a side elevation, with parts broken away and parts in section, illustrating another embodiment of my invention;

Figure 8 is a side elevation of a modification;

Figure 9 is an end view in section of the device illustrated in Figure 8; and

Figure 10 is a sectional view of another modification.

Like parts are indicated by like symbols throughout the specifications and drawings.

Referring to the drawings, and, particularly, to the form of Figures 1 to 4, inclusive, I illustrate a hopper or conveyor housing, or trough, shown as having downwardly converging side walls 1 connected at their lower, inner edges by a generally arcuate bottom 2. 3 indicates any suitable weighing hopper, the details of which do not, of themselves, form part of the present invention. The hopper includes a bottom portion or funnel 4 and a suitable discharge gate 5. 6 diagrammatically indicates any suitable timer for the weighing hopper 3, 4. 7 is any suitable delivery section or portion for the conveyor housing 1. It will be understood that weighed charges from the hopper 3 may be periodically or irregularly delivered through the inlet portion 7 to the interior of one end of the feed trough or housing 1, 1. 10 is any suitable discharge outlet or spout located at the opposite end of the feed trough or housing.

Mounted in the feed trough or housing 1 I illustrate a plurality of conveyor elements, each of which is shown as including a shaft 11 mounted at its opposite ends in any suitable bearings 12, 13, the bearings being located at the opposite ends of the trough or housing 1, 1. In the embodiment of the device shown in Figures 1 to 4, inclusive, each shaft 11 has a coil or helix thereabout which may, for example, be of wire or rod stock bent to the proper pitch. With reference to Fig. 4, I illustrate a plurality of coil elements 14, each of which has generally radial end portions 14a which are shown as received in radical or diametric apertures in the shaft 11. Any suitable set screws 15, or their equivalent, may be employed to hold the members 14a in the proper relationship to the apertures through which they pass. In lieu of the arrangement shown, the coils may be welded or otherwise secured to the shafts.

In my mechanism and method a primary purpose is to receive batch or irregular feed, and to damp out the irregularities, to convert the feed to a regular, continuous, uniform flow. I may do this by several methods or mechanisms. Broadly stated, I prefer to employ conveying elements operating against a given fed mass or increment, at differing conveying potentials.

In a typical structure, as shown in Figure 1, I may employ different pitches in each of the coils when I employ a plurality of conveyor elements located at different heights or levels in the conveyor trough 1, 1. Thus, in Figure 1, I illustrate upper shafts 11 with coils 14 of predetermined pitch. In the next lowest level are shafts carrying coils 16 of a reduced pitch, while the lowest shaft 11 carries coils 17 of still flatter pitch. While, under some circumstances, it is not necessary to use different pitches in the conveyors, under other circumstances I consider it advantageous to have coils of a greater pitch in the upper part of the conveyor trough or housing, and coils of lesser pitch in the lowest part of the conveyor trough or housing. In effect, the upper coils then tend to have a greater conveying movement, whereas the lower coils tend to have a lesser conveying movement. Under other circumstances, however, the situation may be reversed, with the upper coils having a lesser conveying movement, and the lower coils having a greater conveying movement. In case the upper coil has the lesser conveying movement, it effects a hold back action to "piles" or heaps" that may result from substantially large batches being received at the inlet at infrequent intervals.

The coils may be rotated by any suitable means, in directions and at speeds appropriate to their angle of pitch and to their direction. I illustrate, in Figure 2, an example of a practical driving mechanism. 20 indicates any suitable motor, the details of which do not form part of the present invention. It is shown as having a shaft 21 carrying a sprocket 22 about which passes the endless chain 22a. This chain passes about a sequence of sprockets, one mounted on or in driving relation to each of the shafts 11. In the particular arrangement herein shown, and with relation to the parts as indicated in Figure 2, the lowest of the shafts 11 carries a sprocket 23 which is driven in a clockwise direction by the chain 22a. The next higher or intermediate shafts 11 have sprockets 24 and 25, respectively, of which sprocket 24 is driven in a counter-clockwise direction, and sprocket 25 is driven in a clockwise direction, by the looping around and between them of the driving chain 22a. The upper row of shafts 11 carries sprockets 26, 27 and 28, the sprockets 26 and 28 being driven in clockwise direction, whereas the intermediate sprocket 27 is driven in a counter-clockwise direction. It will be understood, of course, that this driving arrangement, while practical and advantageous, is given as an example rather than as a limitation. It will be noted, however, that, taking the group of shafts 11 as a whole, they are driven at a uniform rotational rate, but in different rotational directions. In the intermediate level, and in the highest level, each shaft, and thus each conveying coil, is driven in a rotational direction opposite to that of the adjacent coil or coils.

It will be understood that, whereas, in Figures 1 and 3, I illustrate a plurality of coils of different pitch, but of like diameter, rotated at a uniform speed, I may prefer to leave the pitch uniform or substantially uniform in each conveyor, but to provide a different rate of drive of the conveying coils or elements located at different levels in the trough 1. Or, under some circumstances, it may be advantageous to employ both different pitches, conveyor diameters and different rates or speeds. In any event, in one aspect of the invention I prefer to have a definitely differential conveying action or speed, or pitch, with the upper conveying members tending to move material at a different rate in the direction of conveyance than do the lower.

Where three levels are used, the rate or capacity of feed may, for example, be lowest at the bottom, highest at the top, and at an intermediate rate in the intermediate level.

In the use of the device as herein shown, assume that material is fed to the right-hand end of the trough or housing 1, 1, of Figure 1. The material so fed, whether irregularly delivered, or delivered in measured batches and in timed relation, falls into and through the conveying coils 14 located at the various levels indicated in Figures 1 and 3. In normal use, the material or batches of material dropped into the trough or housing will be distributed to the left, referring to the position of the parts in Figure 1. Since the feeding element of the upper row are the fastest feeders, they throw a substantial portion of the delivered volume to the left, and thus distribute the feed throughout a length of the intermediate row of conveyors substantially greater than the length of the upper conveyors directly subjected to the feed. It should be understood that in the event only a relatively small quantity of material is fed to the trough or housing, this material may be conveyed by only the lowermost conveyor 17. When larger quantities are delivered to the hopper, the aforementioned action of the upper row of conveying elements takes place. Similarly, the intermediate conveyors or coils 16 tend to distribute the material along an increasing length of the lower coil or feeding element 17. In practice, with the coils of the general proportion as shown in Figures 1 and 3, the delivery at the delivery end of the trough or housing, that is to say, the delivery of material by the bottom coil or feed element 16, is uniform and continuous, and without fluctuations. Thus, a sequence of batches delivered from the weighing hopper is converted by my combination of conveying coils to a uniform stream. Thus, timed discharges from an automatic net weigher controlled, for example, by electric clock-type mechanism, are converted into a continuous, uniform stream by the above described device, without the need of any variable speed drives, and without the need of any synchronizing mechanism. While an important advantage and use of my feeding arrangement is in connection with automatic net weighers, it is adaptable to a wide variety of situations where a sequence of batches, regular or irregular, are converted to a regular delivery, or even if a head or pile of material is more or less deeply built up and maintained at the receiving end of the conveyor.

Whereas, particularly for use with feeding devices, it is advantageous to employ a downwardly convergent trough or housing, as shown in Figure 3, with a downwardly decreasing number of feeding elements, I find it advantageous, for many purposes, to employ a feeding assembly in which the feeding elements or coils are located at various levels, but can, if desired, have the same number of elements at different levels. For example, in Figure 5, I illustrate a hopper having generally upright side walls 30 and a plurality of axially extending, arcuate bottom portions 31 converging and uniting in the upward intermediate projection 32. In such a housing I illustrate a plurality of shafts 33 which may be mounted in bearings such as are shown at 13 in Figure 1, and may be driven by any suitable driving means, not herein shown. Each shaft 33 carries a suitable number of coil elements 34 with their radial end portions 34a and securing means 34b. I may widely vary the directions of rotation of the individual shafts or coils. In the event that the direction of rotation differs between different conveying elements, the hand of the spirals may also be varied so that each spiral conveying element moves material from the inlet end toward the outlet end of the feeder. Under some circumstances reverse travel of one or more of the upper conveyors may be desired in order to assure a uniform continuous discharge of material, especially when batch discharges to the unit are of relatively large amounts at infrequent intervals. In Figure 5, I have positioned arrows to indicate that all of the shafts 33 and their conveying coils 34 are rotated in a like direction of rotation. It will be understood that I may employ either different pitches of the coils or different speeds of rotation of the coils, or both, depending upon the particular problem involved. In general, I prefer to so set the pitch or to so control the relative speed of rotation that the upper conveyor elements 33, 34 have a conveying movement or capacity greater than that of the lower. However, under some circumstances, this is not necessary.

Whereas, in all of the figures except Figure 6, I illustrate the above described coil elements of rod or bar stock, it will be understood that I may employ other means or mechanism for providing a conveying coil. In Figure 6, for example, I illustrate a shaft 50 about which a sheet metal coil 51 is positioned. It will be understood that it is a matter of choice, as to all forms of the device herein shown, whether the rod stock coils 14, 15, 16 or 34 are employed, or whether I substitute strip stock or sheet stock, as shown at 51 in Figure 6.

The question of the length of the conveying coils may, under some circumstances, be critical. Where a relatively long conveying zone is necessary, and where floor space is at a premium, I may superpose individual conveyor troughs or housings with groups of conveyors, as shown in Figure 7. Referring to Figure 7, the material is initially fed through a spout 60 to one end of an upper conveyor 61. The material is moved along the conveyor by a group of conveying elements 62, 63 and 64, shown as located at different levels, and of progressively downwardly reduced pitch. Assuming, for example, that the conveyor housing 61 is of the same general shape or contour as that of Figures 1 and 3, a uniform feed will be delivered from the opposite or discharge end of the trough or housings 61, for example, through the spout 65. If a further evening of the feed is thought to be necessary, I may provide a return conveyor housing 66 located beneath the housing 61 and having any suitable number of conveyor elements therewithin. I illustrate, for example, an upper conveyor or conveyors 67 and a lower conveyor or conveyors 68, the upper conveyor having a coarser pitch than the lower. Thus, the modulating or evening effect is continued throughout the length of the conveyor housings 66, and the final feed may be delivered, for example, from the delivery spout 69. It will be understood, of course, as to Figure 7, that the shape of the housings 61 and 66 may be widely varied, and that the number and relative pitch or relative speed of rotation of the conveyors may be widely varied, depending upon the needs of the particular problem. I illustrate, however, any suitable actuating motor 70 having one chain 71 driven by a sprocket 72, and having a second chain 73 driven by a second sprocket 74. The chain 73 passes about sprockets appropriately associated with the individual shafts 62, 63 and 64, whereas the chain 71 passes about and drives the sprockets associated with the shafts 67 and 68. I find it advantageous to provide a uniform driving connection for all of the conveyors employed, since this constitutes a simple and efficient method of maintaining and controlling a predetermined rate of rotation.

In Figures 8 and 9 I illustrate another form of the invention. In these figures the housing is shown at 100 and it includes a plurality of conveyors 101 similar to the conveyors illustrated in Figure 3. In this form of the invention, however, a discharge outlet 102 communicates with the housing through an opening extending around the lower surface of the housing from the center line of the uppermost group of conveyors on one side of the housing to the corresponding points on the other side of the housing. Thus a discharge outlet is provided which will discharge material at varying conveying rates. For example, if the level of material in the housing is only such as to fill a portion of the space defined by the lowermost conveying element, material will be discharged at a rate corresponding to the rate of conveying movement. Larger amounts of material may be discharged at a rate corresponding to the rate of conveying movement. For example, if the level of material is such as to be on the same general level as the center lines of the uppermost conveying elements, all of this material will be discharged, by gravity, generally throughout the opening leading from the housing into the discharge outlet 102. The rate of discharge will correspond to the rate of conveying movement imparted to the material by all of the conveyors at the point of entry into the discharge opening.

A discharge outlet similar to that illustrated in Figures 8 and 9 may be employed, if desired, in each of the forms of the invention illustrated in Figures 1 through 7, inclusive. The discharge capacity of the conveyor will depend upon the size of the discharge opening. For maximum performance, the discharge area should be equal to or greater than the combined cross-sectional area of the several individual conveyors within the housing.

Figure 10 illustrates a further modification of the invention. In this figure two spiral conveyors 110 and 111 are positioned along parallel axes with one conveyor above the other. Each of the conveyors is located within a housing 112. Suitable means such as the chain drives illustrated in the previously described embodiments may be employed to rotate the spirals. A discharge outlet may extend around the lower portion of the housing, from one side to the other, and to a point generally aligned with the center line of the upper conveying element. In this form of the invention the conveyors may be rotated at the same speed and have an identical pitch so that the feeder will deliver a variable quantity of material in a continuous and uniform stream in accordance with the quantity of material fed to the conveyor.

One advantage of the feeding structures shown and described herein resides in the relatively small inactive area in the housing adjacent each conveying element. This inactive area comprises the clearance between the conveyor and the housing extending around approximately one third of the circumference of the conveyor. The total capacity of the feeder is dependent upon the combined capacities of all of the conveyors. Since each of the conveyors utilized in the present invention is relatively small the inactive area at the lower portion of the feeder is relatively small as compared with the capacity of the feeder.

Furthermore, the length of the feeder housing is comparatively small with relation to the maximum capacity of the feeder and with relation to the distributing and leveling action of the conveyors.

It will be realized that whereas I have described and shown a practical and operative device, nevertheless many changes may be made in size, shape, number and disposition of parts without departing from the spirit of my invention. I, therefore, wish my description and drawings to be taken as, in a broad sense, illustrative or diagrammatic rather than as limiting me to my specific disclosure herein. In particular, I wish it to be understood that the sizes, shapes, contours and proportions of the conveyor troughs or housings and of the conveyors themselves may be widely varied, and that the relationships of pitch and of rotation may be widely varied.

For example, I may employ a group of conveying spirals or elements, all of which convey in the same direction, or, under some circumstances, I may prefer to have some of the conveying elements operate to convey in an opposite direction. I may either increase or reduce the conveying rate progressively from the top to the bottom of the tier of conveying or feeding elements. I may operate each of the conveyors at the same conveying potential or may vary the conveying potential of any individual conveyor. In some cases, it is desirable to have the conveying potential of individual conveyors equal to one another as is illustrated in Figure 9. In the arrangement of Fig. 9, the upper levels of conveyors have different conveying potentials inasmuch as there are a larger number of conveyors in the upper levels. With any conveying structure I may include a discharge outlet of relatively large area as is typically shown in the embodiment of Fig. 9.

The use and operation of my invention are as follows:

I provide, basically, a continuous feeder which includes at least two simultaneously rotated, spiral conveying elements located in a space or trough or housing to which material is delivered. At the receiving end of the spiral conveyors material is delivered, for example, in batches, under conditions which subject the material so delivered simultaneously and immediately to the operation of the plurality of spiral conveyors. The spiral conveyors may be designed, shaped or rotated at what I prefer to call different conveying potentials. For example, as shown in Figure 1, where I illustrate a plurality of conveying elements or spiral conveyors at different levels, I show those in the highest level as shaped or inclined for a maximum conveying potential, when all conveyors are driven at the same rotational speed, while the lowest conveyor is shown as designed to deliver at a minimum conveying potential. I may vary the speed of rotation instead of the pitch of the conveyors, or I may vary both. Or I may reverse the conveying direction of one or more of the conveying elements. Thus, it will be seen that I employ a plurality of spiral conveyors, working together within a single housing, or in a series of housings in communication with one another, to handle irregularly or periodically fed material, and to discharge it in a uniform stream. I may widely vary the number and disposition of the spiral conveyors, but I prefer to arrange them in troughs or longitudinal housings, with the conveyors generally located at various levels. If the upper conveyors are of a higher conveying or feeding potential, they tend to spread the material along the lower conveyors. At the material receiving end the material drops through the entire bank of conveyors and is subjected to the differential conveying action of the various conveyors or various levels of conveyors. The overall result, regardless of variations in delivery to the receiving end of the conveyors, is a continuous and uniform delivery from the discharge end of the trough or housing, as long as an adequate volume of delivery is maintained at the receiving end. Thus I provide a gravity feeding means which, with or without a variable speed drive, will form a uniform average level of bulk material passing from the material receiving inlet, where it is received in batches or irregular quantities, and move it to a discharge end, where it is discharged in a continuous uniform stream. With the same structure the quantity delivered may vary from a relatively small amount, such as would be indicated by a level of material below the upper portion of the lowermost conveying unit, to a relatively large quantity of material as would be indicated by a level of material as high as the center line of the uppermost conveyor or above. The quantity delivered per unit time is dependent upon the quantity fed to the inlet end of the feeder. Regardless of the quantity of material delivered through the discharge end, the discharge always takes the form of a continuous and uniform stream.

In considering my method broadly, I may deliver batches or slugs or individual bodies of feed to one end of my conveying assembly, with the result that, before the material escapes from the opposite end of the conveying assembly, it has become a ribbon of uniform depth or volume. A substantial advantage of my system rests in the fact that, with no adjustment or change in the rate of rotation, or in the feeding effect of the conveying elements, I may, without adjustment, increase or reduce the delivery. If smaller increments are supplied to the receiving end of the conveyor assembly, or increments are delivered in smaller numbers per time unit, then the uniform ribbon of delivery at the opposite end is shallower or smaller. On the other hand, if I increase the size of the fed increments, or the rate of feeding such increments, my structure, without any adjustment or adaptation, merely delivers a thicker or deeper, but still uniform ribbon of material from the opposite end. The thickness or depth of the stream is variable within the range indicated by the height of the several conveyors arranged at different levels. Thus, I provide a variable quantity feeder, without the necessity of any change of speed or other adjustment.

Whereas I have emphasized the use of my invention as a feeder, it will be clear that, in a true sense, my feeder is a conveyor, and can be used as a conveyor independently of any particular feeding function. The efficiency of a conveyor in which two or more spirals of the type herein shown are arranged either at the same or at different levels in a conveying trough is, in practice, very high.

In considering the operation of the various features herein disclosed it will be noted that the use of two vertically spaced conveyors in open communication with one another, and with or without a different conveying potential, provides for filling voids in the material stream moved by the lower conveyor. When the conveying potential in the upper conveyor or conveyors is greater than that of the lower conveyor or conveyors, the upper conveyor or conveyors move material at a faster rate and hence tend to dispose material ahead of the stream of material being advanced by the lower conveyor. If the conveying direction is reversed or if the conveying potential in the upper conveyor or conveyors is lower than the conveying potential of the lower conveyors, the upper conveyors tend to "hold back" material and deposit this material behind the stream being advanced by the lower conveyor.

This application is a divisional application of my copending application Serial No. 560,786, filed January 23, 1956.

I claim:

1. In a continuous feeder for powdered or granular material, a longitudinally extending housing having side walls and an end wall and a closed bottom, a plurality of spiral conveyors rotatably mounted in said housing for rotation about generally parallel, longitudinal axes, said spiral conveyors being mounted at different levels within said housing, means for simultaneously rotating said conveyors in a like conveying direction but with different conveying potentials at different levels, and means for feeding material to the conveyors at one end of the housing, the housing having discharge means at the opposite end of the housing.

2. The structure of claim 1, characterized in that the housing has downwardly converging side walls, and the spiral conveyors at different levels within the housing being staggered.

3. The structure of claim 1, characterized by and including directly superposed spiral conveyors.

4. The structure of claim 1, characterized in that the spiral conveyors are arranged at various levels, with the conveyors of the pitch of the respective various levels increasing upwardly from the lowermost conveyor.

5. The structure of claim 1 characterized in that the spiral conveyors are open to permit the flow therethrough of the powdered or granular material.

6. In a continuous conveying mechanism, a longitudinally extending housing having downwardly converging side walls, a plurality of spiral conveying members mounted in said housing for rotation about generally parallel, generally horizontal axes, said conveyors being positioned in said housing at different levels, and means for rotating said conveyors at different rotational speeds with the lowest conveyor in said housing rotating at a speed substantially less than that of the conveyor or conveyors above it, said housing having a material receiving connection at one end and having a discharge outlet at the opposite end positioned to receive the material delivered by the lower conveyor in response to the rotation of said lower conveyor.

7. In a continuous feeder for use with scales and the like, a longitudinally extending housing having downwardly converging side walls, a plurality of spiral conveying members mounted in said housing for rotation about generally parallel, generally horizontal axes, said conveyors being positioned in said housing at different levels, said conveyors being of different pitch, with the lowest conveyor having a pitch different than that of the conveyor or conveyors above it, said housing having a material receiving connection at one end and having a discharge outlet at the opposite end, positioned to receive the material delivered by the lower conveyor in response to the rotation of said conveyor, and means for rotating the conveyors in the same direction.

8. In a continuous conveying structure for use with scales and the like, a generally horizontally extending housing, a plurality of spiral conveying members mounted in said housing for rotation about generally parallel, generally horizontal axes, said conveyors being positioned in said housing at a plurality of different levels, means for rotating said conveyors in unison, but with different conveying potentials at different levels to thereby convey material in all conveyors in the same direction, the conveying potential of said conveyors decreasing progressively from the highest to the lowest conveyors in the housing, said housing having an end outlet.

9. A conveying mechanism including a conveying trough having an inlet, an outlet, means for conveying material between said inlet and said outlet, means for feeding material into said inlet, a second conveying means extending through substantially the entire length of said first conveying means, means for delivering at least a portion of said fed material to said second conveying means, said second conveying means being formed and adapted to deliver material carried thereby to the first conveying means throughout the length of said first conveying means, and means for operating said second conveying means in the same direction but at a higher conveying potential than said first conveying means to thereby maintain the quantity of material delivered to said outlet substantially constant.

10. In a continuous variable quantity feeder, a longitudinally extending housing, a plurality of spiral conveyors rotatably mounted in said housing for rotation about generally parallel, longitudinal axes, said spiral conveyors being mounted at different levels within the housing, means for simultaneously rotating said conveyors in the same direction but at different conveying potentials at different levels, and means for feeding material to the conveyors at one end of the housing, the housing having discharge means at its opposite end.

11. A variable quantity feeder including a conveying housing having an inlet end portion and a discharge end portion, a plurality of spiral conveyors rotatably mounted in said housing and positioned on parallel axes, one of said conveyors being positioned above the other, means for simultaneously rotating the conveyors in a like conveying direction but with different conveying potentials at different levels, and a discharge opening at the discharge end of said housing, said opening having a length, taken about the surface of the housing at least equal to the distance between points on the lower portion of the housing generally aligned with but on opposite sides of the axis of the upper conveyor.

12. The structure of claim 11 wherein the upper conveyor is mounted for rotation about an axis spaced laterally of the axis of rotation of the lower conveyor.

13. A variable quantity feeder including a conveying housing having an inlet end portion and a discharge end portion, and a plurality of spiral conveyors located within the housing and extending generally from the inlet end portion to the discharge end portion, means mounting said conveyors for rotation about generally parallel axes, the space between said conveyors being unobstructed for a substantial length of the conveyors, whereby material conveyed may flow from one conveyor to another, at least one of the conveyors being spaced vertically from the other, and means for simultaneously rotating the conveyors in a like conveying direction but with different conveying potentials at different levels, the discharge end portion including a discharge opening directly disposed to the discharge end of each conveyor.

14. In a conveyor structure, a conveyor trough, a plurality of conveying assemblies in said trough, each assembly including a rectilinear shaft and a spiral coil surrounding and rotating with each said shaft, the assemblies being arranged in generally parallel relation and being located at different levels in the trough, the space within the trough between the assemblies being unobstructed, and means for rotating the assemblies in unison in the same conveying direction but with different conveying potentials at different levels.

References Cited in the file of this patent

UNITED STATES PATENTS

| | | |
|---|---|---|
| 326,769 | McClurg | Sept. 22, 1885 |
| 339,561 | Locke | Apr. 6, 1886 |
| 1,880,840 | Currier | Oct. 4, 1932 |
| 2,119,919 | Knight et al. | June 7, 1938 |
| 2,126,776 | Hogg | Aug. 16, 1938 |
| 2,459,951 | Metzner | Jan. 25, 1949 |

FOREIGN PATENTS

| | | |
|---|---|---|
| 232,403 | Great Britain | Apr. 23, 1925 |